(12) United States Patent
Kim

(10) Patent No.: US 10,338,848 B2
(45) Date of Patent: Jul. 2, 2019

(54) ELECTRONIC DEVICE DATA RECORDING METHOD AND ELECTRONIC DEVICE THEREOF

(71) Applicant: SAMSUNG ELECTRONICS CO., LTD., Suwon-si, Gyeonggi-do (KR)

(72) Inventor: Tae-Young Kim, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 42 days.

(21) Appl. No.: 15/324,927

(22) PCT Filed: Jul. 10, 2014

(86) PCT No.: PCT/KR2014/006190
§ 371 (c)(1),
(2) Date: Jan. 9, 2017

(87) PCT Pub. No.: WO2016/006737
PCT Pub. Date: Jan. 14, 2016

(65) Prior Publication Data
US 2017/0199706 A1    Jul. 13, 2017

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0246* (2013.01); *G06F 2212/2022* (2013.01); *G06F 2212/7205* (2013.01)

(58) Field of Classification Search
CPC .... G06F 3/0659; G06F 3/0604; G06F 3/0679; G06F 12/0246; G06F 2212/2022; G06F 2212/7205
See application file for complete search history.

(56) References Cited

U.S. PATENT DOCUMENTS

| 5,581,504 A | 12/1996 | Chang |
| 2002/0110023 A1 | 8/2002 | Yoshida |
| 2010/0199150 A1 | 8/2010 | Shalvi et al. |
| 2012/0030506 A1 | 2/2012 | Post et al. |
| 2012/0117557 A1 | 5/2012 | Li |
| 2012/0124273 A1 | 5/2012 | Goss et al. |

(Continued)

FOREIGN PATENT DOCUMENTS

JP    2002-182989    6/2002

OTHER PUBLICATIONS

International Search Report for PCT/KR2014/006190, dated Feb. 26, 2015, 4 pages.

(Continued)

*Primary Examiner* — Shawn X Gu
(74) *Attorney, Agent, or Firm* — Nixon & Vanderhye P.C.

(57) ABSTRACT

Various examples of the present invention relate to an electronic device data recording method and an electronic device thereof, and an electronic device operating method can comprise the steps of: determining a data recording possibility of a specific area of a nonvolatile memory in which data is to be recorded; and determining whether to record data based on the data recording possibility. In addition, the various examples of the present invention also include the aforementioned example and other examples.

15 Claims, 14 Drawing Sheets

(56) References Cited

U.S. PATENT DOCUMENTS

| | | |
|---|---|---|
| 2012/0184319 A1 | 7/2012 | Wang et al. |
| 2013/0339570 A1* | 12/2013 | Franceschini ....... G06F 12/0246 711/102 |
| 2014/0052897 A1 | 2/2014 | Goss et al. |
| 2014/0075097 A1* | 3/2014 | Nagai ................... G06F 3/0616 711/103 |
| 2014/0136883 A1 | 5/2014 | Cohen |

OTHER PUBLICATIONS

Written Opinion of the ISA for PCT/KR2014/006190, dated Feb. 26, 2015, 6 pages.

\* cited by examiner

Garbage Collection Information

| eMMC | defect block |
|---|---|
| eMMC 1 | block 5 |
|  | block 9 |
|  | block 258 |
|  | ⋮ |
| eMMC 2 | block 14 |
|  | block 25 |
|  | block 469 |
|  | ⋮ |
| ⋮ | ⋮ |

FIG.13

ELECTRONIC DEVICE DATA RECORDING METHOD AND ELECTRONIC DEVICE THEREOF

CROSS-REFERENCE TO RELATED APPLICATION

This application is the U.S. national phase of International Application No. PCT/KR2014/006190, filed Jul. 10, 2014, which designated the United States. The contents of this PCT application are incorporated herein in their entirety.

TECHNICAL FIELD

Various embodiments of the present invention relate to a data recording method of an electronic device and an electronic device thereof.

BACKGROUND ART

In general, various types of electronic devices such as a smart phone or a tablet PC may record and store important data such as an Operation System (OS) or a file system in a non-volatile memory.

The nonvolatile memory may be various memories such as a Secure Digital (SD) card, a Universal Flash Storage (UFS) card, and an embedded Multi Media Card (eMMC).

For example, the eMMC, which is a large-scale storage medium such as 32 GB, 64 GB, and 128 GB, may record and store data in an NAND flash memory which is a last stage.

Recently, a manufacturing process of a non-volatile memory such as the flash memory has changed to a fine process, and, furthermore, as several bits are recorded and stored in one cell in the flash memory, maintainability of the stored data becomes weak.

When only an operation of reading data is intensively repeated after the important data such as the file system is recorded and stored in the flash memory, there is an increased risk of a value of the stored data being changed according to characteristics of the flash memory.

For example, when only one word line among several word lines configuring one block of the flash memory is intensively and repeatedly read, a threshold voltage (Vth) of another word line, which is not selected, gradually increases to cause a read disturb phenomenon in which data cannot be normally read. Since the read disturb phenomenon is a publicly known technology, a specific description thereof will be omitted.

When the read disturb phenomenon occurs, although data recording is impossible, an error for wrongly determining that the data recording is possible may occur. Therefore, for example, a problem in that important data such as a file system is wrongly recorded may occur.

DETAILED DESCRIPTION OF THE INVENTION

Technical Problem

Various embodiments of the present invention provide a data recording method of an electronic device, which selectively performs a data recording operation by determining whether data is recorded when various types of electronic devices such as a smart phone or a tablet PC record important data such as a file system in a non-volatile memory, and an electronic device thereof.

Technical Solution

In accordance with an aspect of the present invention, there is provided a method of operating an electronic device. The method may include: determining a data recording possibility of a specific area of a non-volatile memory in which data is to be recorded; and determining whether data is recorded based on the data recording possibility.

In accordance with another aspect of the present invention, there is provided an electronic device. The electronic device may include: a non-volatile memory configured to store data; and a processor configured to determine a data recording possibility of a specific area of the non-volatile memory and determine whether data is recorded.

In accordance with another aspect of the present invention, there is provided an electronic device. The electronic device may include: a non-volatile memory configured to store data; and a processor configured to control the non-volatile memory, wherein the non-volatile memory may include an internal memory controller and a memory cell array, and the internal memory controller may determine a data recording possibility of a specific area of the memory cell array and determines whether data is recorded.

Advantageous Effects

According to various embodiments of the present invention, when recording data in a non-volatile memory (e.g., an eMMC, an SD card, and a UFS card), various types of electronic devices such as a smart phone or a tablet PC may previously determine a data recording possibility of a specific area of the non-volatile memory, in which the data is to be recorded, to determine whether the data is recorded. Therefore, the electronic devices enable the data recording error for wrongly recording important data such as a file system to be previously prevented in a situation in that the data recording is impossible due to a read disturb phenomenon.

Furthermore, the electronic devices classify and manage identification information of a specific area, in which the data recording is impossible, as garbage collection information such that a garbage collection operation of causing the area, in which the data recording is impossible, not to be unnecessarily accessed may be performed. Further, the electronic devices display guide messages of a data recording failure and a recording failure cause so that a user can accurately know whether the data recording fails and the cause of the recording failure.

BRIEF DESCRIPTION OF THE DRAWINGS

FIG. 13 illustrates garbage collection information according to various embodiments of the present invention.

MODE FOR CARRYING OUT THE INVENTION

Figure 1:
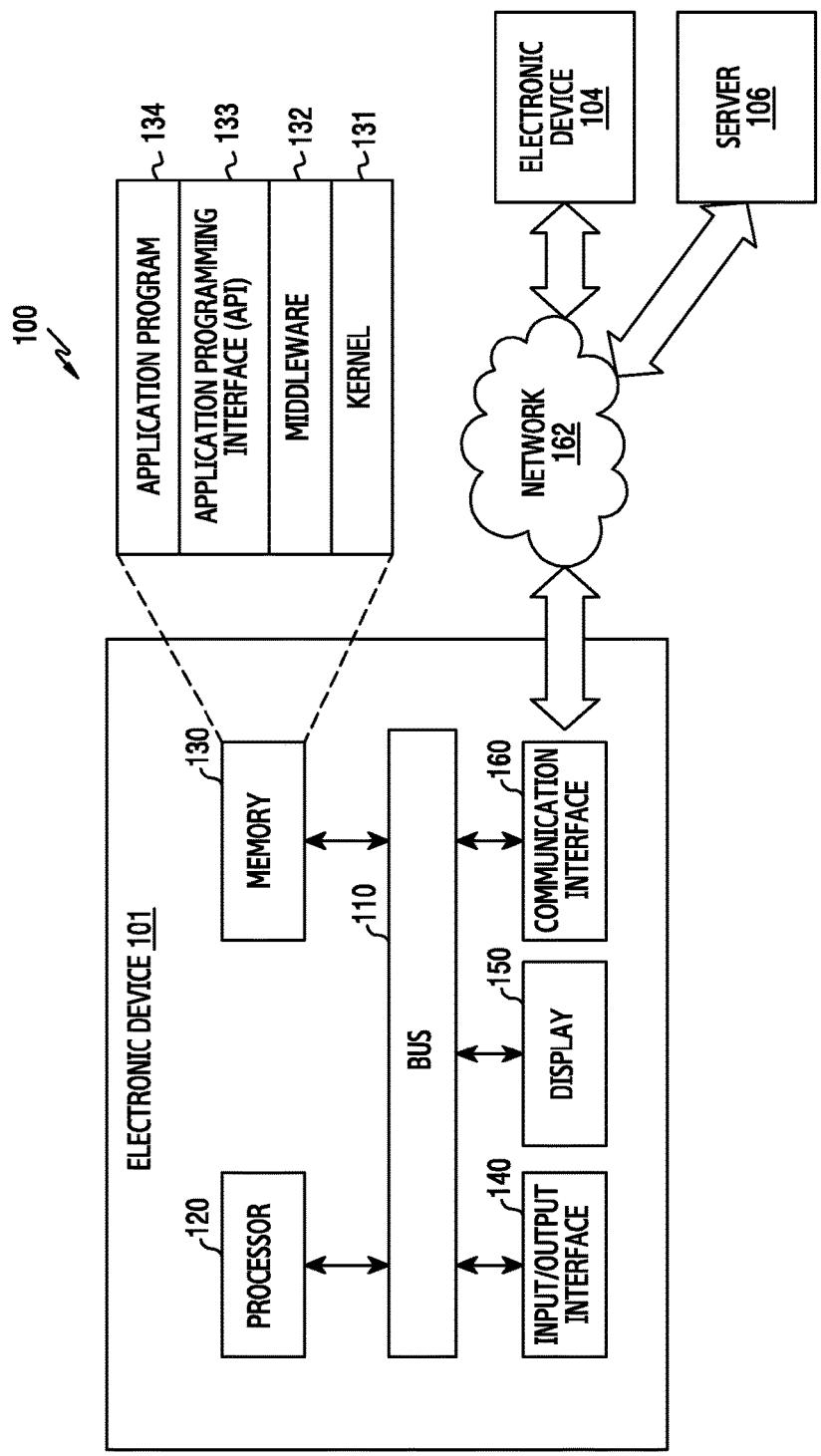
FIG. 1 illustrates a network environment including an electronic device according to various embodiments of the present invention.

Hereinafter, various embodiments of the present invention will be described with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments disclosed herein, but the present invention should be construed to cover all modifications, equivalents, and/or alternatives falling within the spirit and scope of the various embodiments of the present invention. In connection with descriptions of the drawings, like reference numerals designate like elements.

As used in various embodiments of the present invention, the expression "include" or "may include" refers to the existence of a corresponding function, operation, or element, and does not exclude one or more additional functions, operations, or elements. Further, as used in various embodiments of the present invention, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Further, as used in various embodiments of the present invention, the expression "or" includes any or all combinations of words enumerated together. For example, the expression "A or B" may include A, may include B, or may include both A and B. While expressions including ordinal numbers, such as "first" and "second", as used in various embodiments of the present invention may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present invention.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present invention.

An electronic device according to various embodiments of the present invention may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present invention may be a combination of one or more of the aforementioned various devices. Further, the electronic device according to various embodiments of the present invention may be a flexible device. Further, it will be apparent to those skilled in the art that the electronic device according to various embodiments of the present invention is not limited to the aforementioned devices.

Hereinafter, an electronic device according to various embodiments of the present invention will be described with reference to the accompanying drawings. The term "user" used in various embodiments of the present invention may indicate a user who uses an electronic device or a device that uses an electronic device, such as an artificial intelligence electronic device.

FIG. 1 illustrates a network environment 100 including an electronic device 100 according to various embodiments of the present invention. Referring to FIG. 1, the electronic device 101 may include a bus 110, a processor 120, a memory 130, an input/output interface 140, a display 150, and a communication interface 160.

The processor 120 may, for example, receive instructions from other components (for example, the memory 130, the input/output interface 140, the display 150, and the communication interface 160) through the bus 110, analyze the received instructions, and execute calculations or data processing according to the analyzed instructions.

The memory 130 may store instructions or data received from or created by the processor 120 or other elements (e.g., the input/output interface 140, the display 150, and the communication interface 160). The memory 130 may include programming modules, such as a kernel 131, middleware 132, an Application Programming Interface (API) 133, an application 134, and the like. Each of the aforementioned programming modules may be formed of software, firmware, hardware, or a combination of at least two thereof.

The kernel 131 may control or manage system resources (e.g., the bus 110, the processor 120, or the memory 130) used for executing an operation or a function implemented in the remaining other programming modules, for example, the middleware 132, the API 133, or the application 134. In addition, the kernel 131 may provide an interface through which the middleware 132, the API 133, or the applications 134 may control or manage the individual components of the electronic device 101 while accessing the individual components.

The middleware 132 may perform a relay function of allowing the API 133 or the application 134 to communicate with the kernel 131 to exchange data therewith. Furthermore, with regard to task requests received from the applications 134, the middleware 132 may perform a control (for example, scheduling or load balancing) for the task requests using, for example, a method of assigning a priority, by which the system resources (for example, the bus 110, the processor 120, or the memory 130) of the electronic device 101 may be preferentially used, to at least one of the applications 134.

The API 133 is an interface through which the applications 134 may control functions provided by the kernel 131 and the middleware 132, and may include at least one interface or function (for example, instruction) for file control, window control, image processing, or text control.

According to various embodiments, the application 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, and the like). Additionally or alternately, the application 134 may be an application related to the exchange of information between the electronic device 101 and an external electronic device (e.g., an electronic device 104). The application related to the exchange of information may include, for example, a notification relay application for transferring predetermined information to the external electronic device or a device management application for managing the external electronic device.

For example, the notification relay application may include a function of transferring, to the external electronic device (e.g., the electronic device 104), notification information generated in other applications of the electronic device 101 (e.g., an SMS/MMS application, an e-mail application, a health management application, an environmental information application, and the like). Additionally or alternatively, the notification relay application may receive notification information from, for example, an external electronic device (e.g., the electronic device 104) and may provide the received notification information to a user.

The device management application may, for example, manage (e.g., install, delete, or update) functions for at least a part of an external electronic device (e.g., the electronic device 104) that communicates with the electronic device 101 (e.g., turning on/off the external electronic device itself (or some elements thereof) or adjusting the brightness (or resolution) of a display), applications that operate in the external electronic device, or services (e.g., a telephone call service or a message service) that are provided by the external electronic device.

According to various embodiments, the application 134 may include an application designated according to an attribute (e.g., a type of the electrode device) of the external electronic device (e.g., the electronic device 104). For example, in cases where the external electronic device is an MP3 player, the applications 134 may include an application related to the reproduction of music. Similarly, in cases where the external electronic device is a mobile medical appliance, the applications 134 may include an application related to health care. According to an embodiment, the applications 134 may include at least one of applications specified to the electronic device 101 and applications received from an external electronic device (e.g., a server 106 or the electronic device 104).

The input/output interface 140 may transfer instructions or data input from a user through an input/output device (e.g., a sensor, a keyboard, or a touch screen) to the processor 120, the memory 130, and the communication interface 160 through, for example, the bus 110. For example, the input/output interface 140 may provide, to the processor 120, data for a user's touch input through the touch screen. In addition, through the input/output device (e.g., a speaker or a display), the input/output interface 140 may output instructions or data received from the processor 120, the memory 130, or the communication interface 160 through the bus 110. For example, the input/output interface 140 may output voice data, processed through the processor 120, to a user through a speaker.

The display 150 may display various pieces of information (e.g., multimedia data or text data) to a user. The communication interface 160 may connect communication between the electronic device 101 and the external electronic device (e.g., the electronic device 104 or the server 106). For example, the communication interface 160 may be connected to a network 162 through wireless or wired communication to communicate with the external device. The wireless communication may include at least one of, for example, Wi-Fi, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The communication network may include at least one of a computer network, the Internet, the Internet of things, and a telephone network. According to one embodiment, a protocol (e.g., a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

Figure 2:
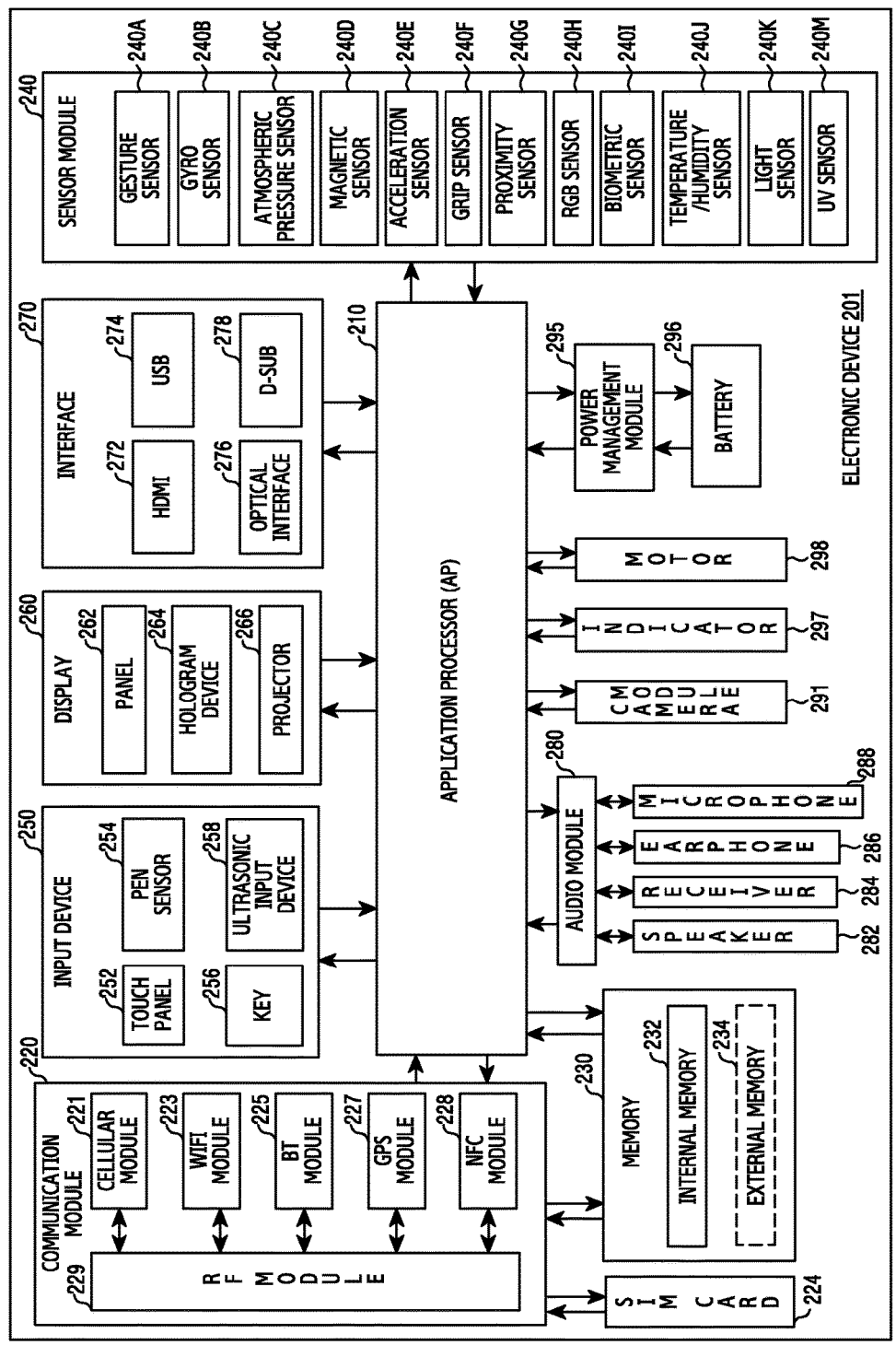
FIG. 2 is a block diagram illustrating a configuration of an electronic device according to various embodiments of the present invention.

FIG. 2 is a block diagram illustrating a configuration of an electronic device 201 according to various embodiments of the present invention. An electronic device 201 may form, for example, a part or the entirety of the electronic device 101 illustrated in FIG. 1. Referring to FIG. 2, the electronic device 201 may include at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software elements connected to the AP 210 by driving an operating system or an application program and process various types of data including multimedia data and perform calculations. The AP 210 may be implemented as, for example, a system on chip (SoC). According to an embodiment, the AP 210 may further include a graphic processing unit (GPU) (not illustrated).

The communication module 220 (e.g., the communication interface 160) may perform data transmission/reception in communication between the electronic device 201 (e.g., the electronic device 101) and other electronic devices (e.g., the electronic device 104 and the server 106) connected thereto through a network. According to an embodiment of the present invention, the communication module 220 may include a cellular module 221, a Wi-Fi module 223, a BT module 225, a GPS module 227, an NFC module 228, and a radio frequency (RF) module 229.

The cellular module 221 may provide a voice call, a video call, a Short Message Service (SMS), or an Internet service through a communication network (e.g., LTE, LTE-A, CDMA, WCDMA, UMTS, WiBro, OR GSM). Further, the cellular module 321 may perform identification and authentication of electronic devices in a communication network using, for example, a subscriber identification module (e.g., the SIM card 224). According to an embodiment, the cellular module 221 may perform at least some of the functions that the AP 210 may provide. For example, the cellular module 221 may perform at least some of the multimedia control functions.

According to an embodiment of the present invention, the cellular module 221 may include a communication processor (CP). Furthermore, the cellular module 221 may be implemented as, for example, an SoC. Although FIG. 2 shows the elements such as the cellular module 221 (e.g., CP), the memory 230, and the power management module 295 as being separate from the AP 210, the AP 210 may be implemented to include at least some (e.g., the cellular module 221) of the above elements according to an embodiment of the present invention.

According to an embodiment of the present invention, the AP 210 or the cellular module 221 (e.g., a communication processor) may load and process instruction or data received from at least one of non-volatile memories (e.g., an eMMC, an SD card, and an UFS card) or other components which are respectively connected thereto. Furthermore, the AP 210 or the cellular module 221 may store, in a non-volatile memory, data received from or generated by at least one of other component elements.

The Wi-Fi module 223, the BT module 225, the GPS module 227, and the NFC module 228 may include, for example, a processor for processing data transmitted/received through a corresponding module. In FIG. 2, the cellular module 221, the Wi-Fi module 223, the BT module 225, the GPS module 227, and the NFC module 228 are illustrated as separate blocks. However, according to an embodiment, at least some (e.g., two or more) of the cellular module 221, the Wi-Fi module 223, the BT module 225, the GPS module 227, and the NFC module 228 may be included in one integrated chip (IC) or one IC package. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, an RF signal. Although not illustrated, the RF module 229 may, for example, include a transceiver, a power amp module (PAM), a frequency filter, a low noise amplifier (LNA), or the like. In addition, the RF module 229 may further include a component, such as a conductor or a conductive wire, for transmitting/receiving an electromagnetic wave in a free space in wireless communication. In FIG. 2, although the cellular module 221, the Wi-Fi module 223, the BT module 225, the GPS module 227, and the NFC module 228 are illustrated to share a single RF module 229, according to an embodiment, at least one of the cellular module 221, the Wi-Fi module 223, the BT module 225, the GPS module 227, and the NFC module 228 may transmit/receive the RF signal through a separate RF module.

The SIM card 224 may be a card including a subscriber identification module, and may be inserted into a slot formed in a particular portion of the electronic device. The SIM card 224 may include unique identification information (for example, an Integrated Circuit Card IDentifier (ICCID)) or subscriber information (for example, an International Mobile Subscriber IDentity (IMSI)).

The memory 230 (for example, the memory 130) may include an internal memory 232 or an external memory 234. The internal memory 232 may include at least one of a volatile memory (e.g., a Dynamic Random Access Memory (DRAM), a Static RAM (SRAM), a Synchronous Dynamic RAM (SDRAM), or the like), a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like), an embedded Multi Media Card (eMMC), a Secure Digital (SD) card, and an Universal Flash Storage (UFS).

According to an embodiment, the internal memory 232 may be the eMMC. The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected with the electronic device 201 through various interfaces. According to an embodiment, the electronic device 201 may further include a storage device (or storage medium) such as a hard drive.

The sensor module 240 may measure a physical quantity or sense an operation state of the electronic device 201 to convert the measured or sensed information into an electronic signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 840H (e.g., a Red/Green/Blue (RGB) sensor), a bio-sensor 240I, a temperature/humidity sensor 240J, an illumination sensor 240K, and an Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor (not illustrated), and an iris sensor (not illustrated). The sensor module 240 may further include a control circuit for controlling one or more sensors included therein.

The input device 250 may include a touch panel 252, a (digital) pen sensor 254, a key 256, or an ultrasonic input device 258. The touch panel 252 may recognize a touch input in at least one type among, for example, a capacitive type, a resistive type, an infrared type, and an ultrasonic type. Further, the touch panel 252 may further include a control circuit. In case of the capacitive type touch panel, physical contact or proximity detection is possible. The touch panel 252 may further include a tactile layer. In this event, the touch panel 252 may provide a tactile response to the user.

The (digital) pen sensor 254 may be implemented, for example, using a method that is the same as or similar to receiving a user's touch input, or using a separate recognition sheet. The key 256 may include, for example, a physical button, an optical key, or a keypad. The ultrasonic input device 258 may identify data by detecting an acoustic wave with a microphone (e.g., a microphone 288) of the electronic device 201 through an input unit generating an ultrasonic signal, and may perform wireless detection. According to an embodiment, the electronic device 201 may also receive a user input from an external device (for example, a computer or a server) connected thereto by using the communication module 220.

The display 260 (for example, the display 150) may include a panel 262, a hologram device 264, or a projector 266. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may be integrated with the touch panel 252 to configure one module. The hologram device 264 may show a stereoscopic image in the air by using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert a sound and an electronic signal. At least some elements of the audio module 280 may be included in, for example, the input/output interface 140 illustrated in FIG. 1. The audio module 280 may process sound information input or output through, for example, the speaker 282, the receiver 284, the earphones 286, the microphone 288 or the like. The camera module 291 is a device that can take still and moving images, and according to an embodiment, may include one or more image sensors (e.g., a front sensor or a rear sensor, not shown), a lens (not shown), an image signal processor (ISP) (not shown), or a flash (e.g., an LED or a xenon lamp, not shown).

The power management module 295 may manage a power of the electronic device 201. For example, the power management module 295 may include a Power Management Integrated Circuit (PMIC), a charger Integrated Circuit (IC), or a battery or fuel gauge. The PMIC may be mounted, for example, in integrated circuits or SoC semiconductors. The charging methods may be classified into wired charging and wireless charging. The charger IC may charge a battery and prevent inflow of excessive voltage or excessive current from a charger.

According to an embodiment, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge may measure, for example, a remaining quantity of the battery 296, or a voltage, a current, or a temperature during charging. The battery 296 may store or generate electricity and supply power to the electronic device 201 using the stored or generated electricity. The battery 296 may include, for example, a rechargeable battery or a solar battery.

The indicator 297 may display a specific status of the electronic device 201 or a part (e.g. the AP 210) of electronic device, for example, a booting status, a message status, a charging status, and the like. The motor 298 can convert an electrical signal into a mechanical vibration. Although not illustrated, the electronic device 201 may include a processing unit (e.g., GPU) for supporting a mobile TV. The processing device for supporting the mobile TV may process media data according to standards, for example, a digital multimedia broadcasting (DMB), a digital video broadcasting (DVB), a media flow, or the like.

Each of the above described elements of the electronic device according to various embodiments of the present invention may be formed of one or more components, and the name of a corresponding element may vary according to the type of an electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

Hereinafter, according to various embodiments of the present invention, a data recording method of an electronic device and an electronic device thereof will be described in detail.

An electronic device according to various embodiments may be various types of electronic devices such as a smart phone, or a table PC and may include components shown in FIGS. 1 and 2.

Figure 3:
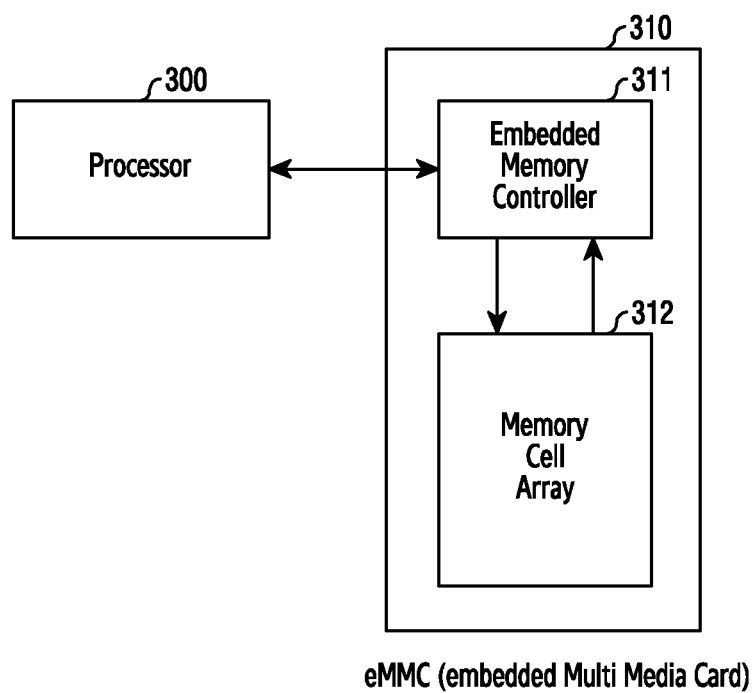
FIG. 3 is a block diagram illustrating a part of a configuration of an electronic device according to various embodiments of the present invention.

FIG. 3 is a block diagram illustrating a part of a configuration of an electronic device according to various embodiments of the present invention. Referring to FIG. 3, various types of electronic devices such as a smart phone, or a tablet PC may include a processor 300 and an internal memory 310. The internal memory 310 is a non-volatile memory, and, for example, a Secure Digital (SD) card, a Universal Flash Storage (UFS) card, and an embedded Multi Media Card (eMMC) may be used.

Figure 4:
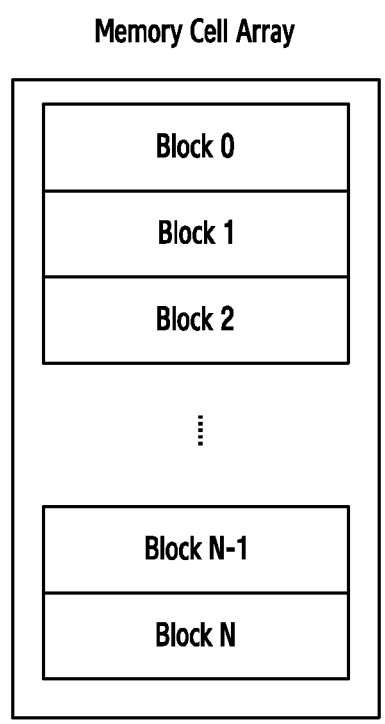
FIG. 4 is a block diagram illustrating a configuration of a memory cell array according to various embodiments of the present invention.

For example, the eMMC may include an internal (embedded) memory controller 311, a memory cell array 312, or the like. For example, as shown in FIG. 4, the memory cell array 312 may be configured by a plurality of blocks (e.g., block 0~N) and each block may be configured by a plurality of Bit Lines (BLs) and a plurality of Word Lines (WLs).

Figure 5:
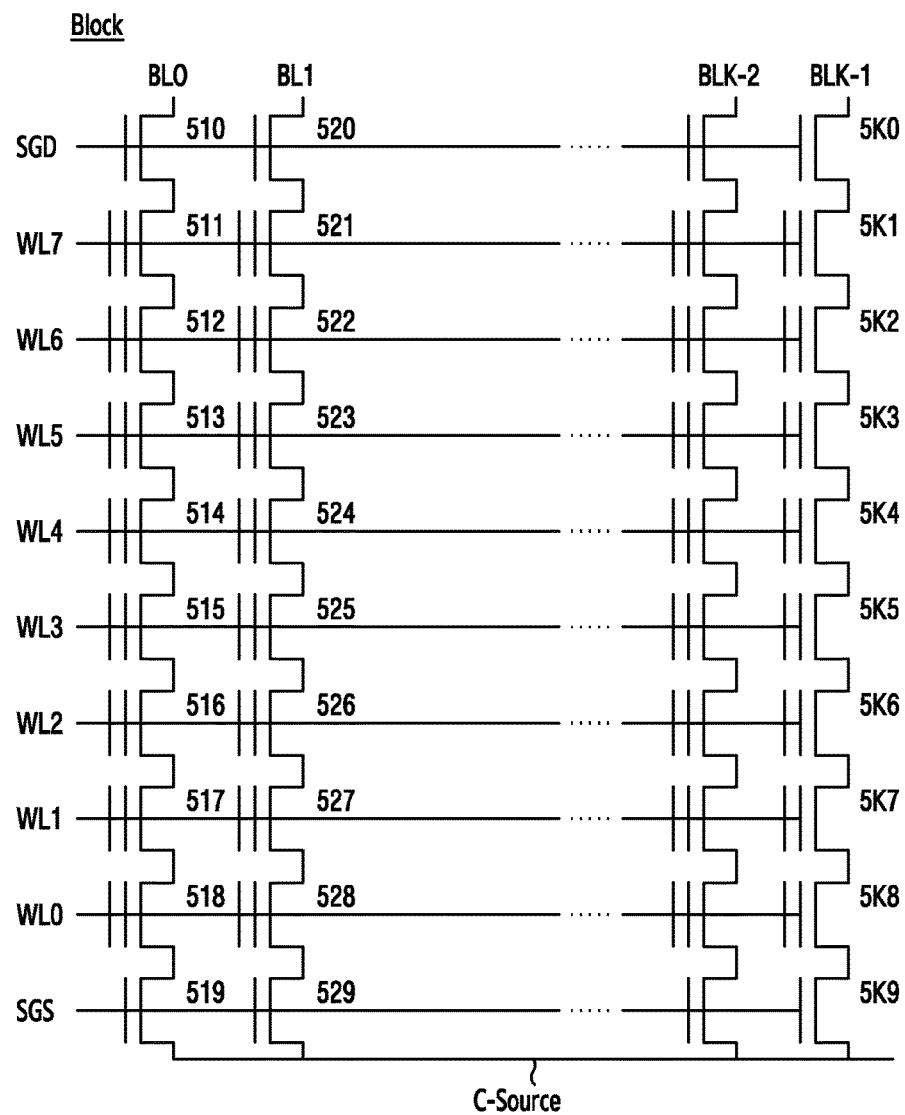
FIG. 5 illustrates a configuration of a block of the memory cell array according to various embodiments of the present invention.

FIG. 5 illustrates a configuration of a block of the memory cell array according to various embodiments of the present invention. Referring to FIG. 5, the memory cell array 312 included in the internal memory 310 may be, for example, a NAND flash memory. Any one block in the memory cell array 312 may horizontally include K bit lines BL0~BLK-1 and each bit line (e.g., BL0) may vertically include 2 selection transistors (e.g., 510 and 519) and 8 memory cells (e.g., 511~518).

The number of memory cells may be less than or larger than 8, and horizontal directions of the memory cells correspond to word lines (WLs), respectively. For example, a block of FIG. 5 has a data recording capacity in which 8 word lines WL0~WL7 and K bit lines BL0~BLK-1 are combined. For example, when there are 1000 bit lines, the block has a recording capacity of "8×1000" bits, i.e., 8 Kbits in which 8 word lines and 1000 bit lines are combined.

One (e.g., 519) of the selection transistors (e.g., 510 and 519) is a Select Gate Source (SGS) transistor and is connected to a source line, and the other (e.g., 510) is a Select Gate Drain (SGD) transistor and is connected to a bit line (e.g., BL0).

The word line WL is connected to a control gate corresponding to horizontal memory cells. For example, a first word line WL0 is connected to k control gates corresponding to horizontal memory cells 519~5K9, and a second word line WL1 is connected to k control gates corresponding to horizontal memory cells 518~5K8.

Figure 6:
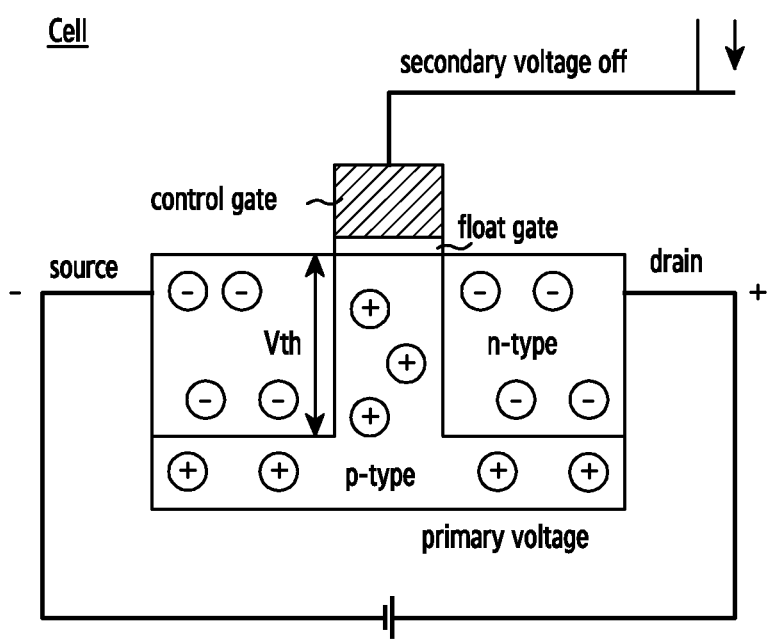
FIG. 6 illustrates a process in which data of 0 is recorded in a cell according to various embodiment of the present invention.
Figure 7:
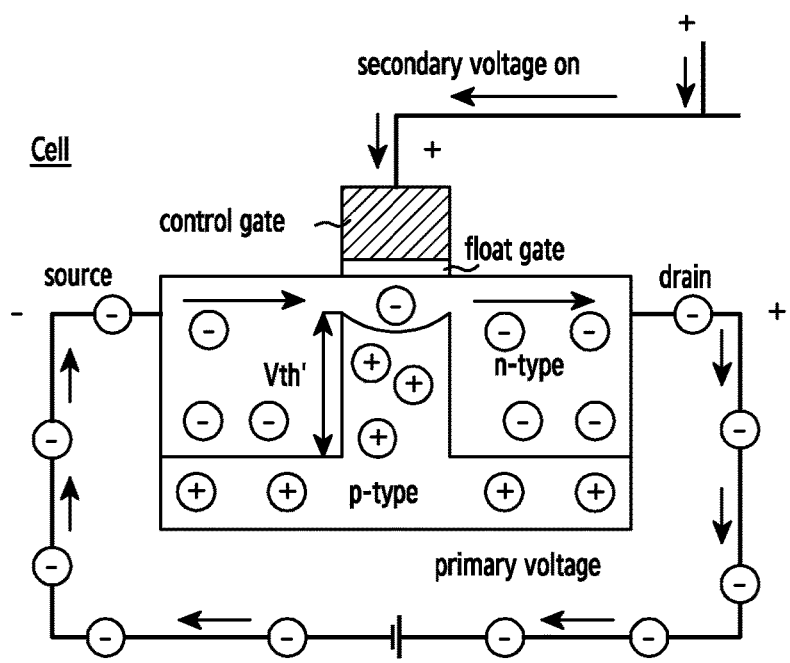
FIG. 7 illustrates a process in which data of 1 is recorded in a cell according to various embodiment of the present invention.

FIG. 6 illustrates a process in which data of 0 is recorded in a cell according to various embodiment of the present invention, and FIG. 7 illustrates a process in which data of 1 is recorded in a cell according to various embodiment of the present invention.

In the memory cell array 312, for example, a NAND flash memory may be used. When a threshold voltage (Vth) applied to a cell of the NAND flash memory is high, a current does not flow so that data of 0 is recorded. Further, when the threshold voltage (Vth) applied to the cell of the NAND flash memory is low, the current flows so that data of 1 is recorded.

Referring to FIG. 6, when a secondary voltage is not applied to a control gate of the cell, a high threshold voltage (Vth) is maintained between a source and a drain in the cell and the current does not flow so that the data of 0 is recorded.

Referring to FIG. 7, when the secondary voltage is applied to a gate of the cell, the threshold voltage (Vth) between a source and a drain in the cell becomes lower and the current flows so that the data of 1 is recorded.

Figure 8:
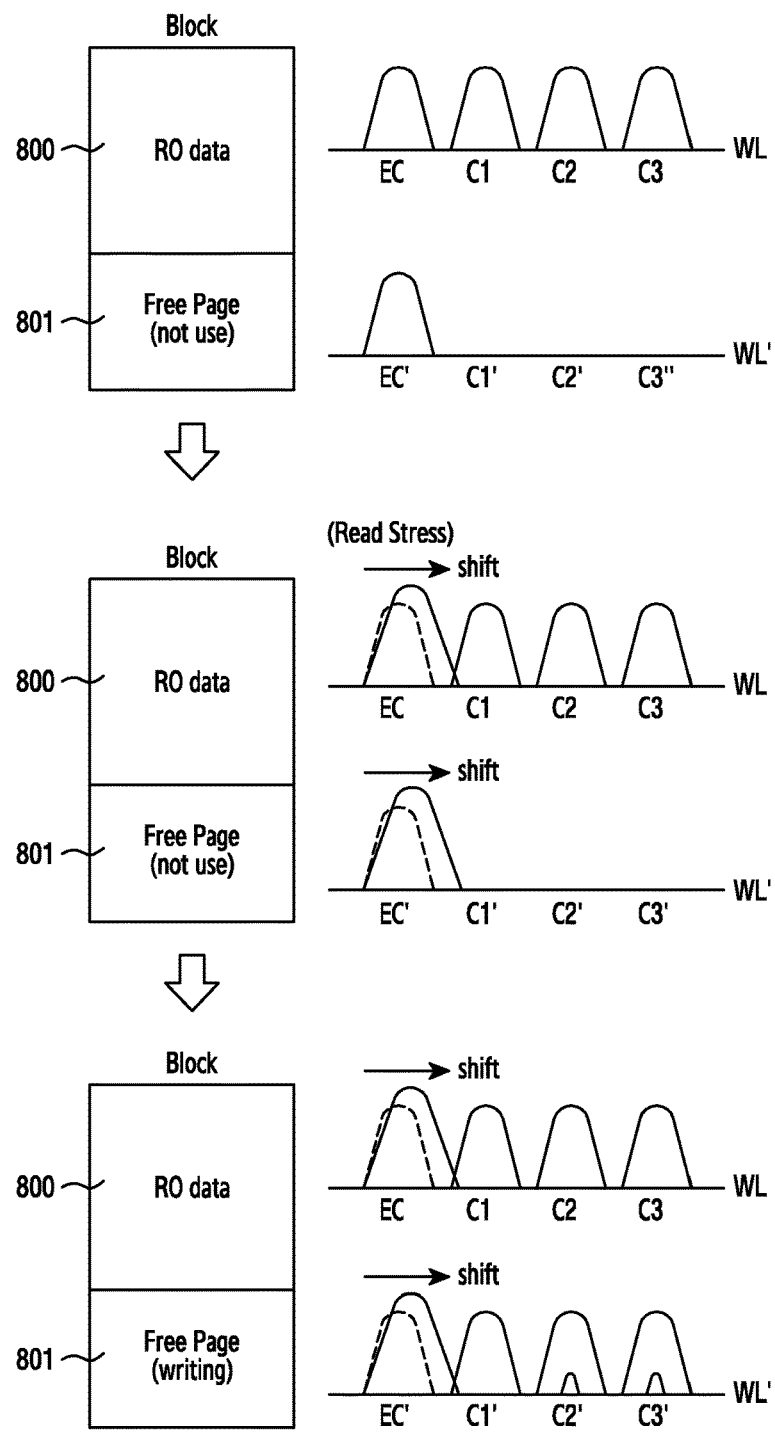
FIG. 8 illustrates a process in which data is wrongly recorded in a free page area of a block according to various embodiments of the present invention.

FIG. 8 illustrates a process in which data is wrongly recorded in a free page area of a block according to various embodiments of the present invention. Referring to FIG. 8, important data such as Operation System (OS), and a file system may be recorded in the memory cell array 312, for example, the NAND flash memory.

In one or more blocks of the NAND flash memory, an area where data is already recorded, for example, a Read Only (RO) data area 800 and an area where data is not recorded, for example, a free page area 801 may exist. The RO data area 800 and the free page area 801 may be referred to as other names.

When a specific word line (WL) included in the RO data area 800 is intensively and repeatedly read, since an Erase Cell (EC) which is a first cell included in the specific word line (WL) receives a read stress, a degree of scattering of the EC is unnaturally shifted and widens. Therefore, a disturb phenomenon (e.g., a phenomenon in which EC is shifted to the right and overlaps with C1 so that reading becomes difficult) occurs due to influence of other cells (e.g., C1, C2, and C3), i.e., a read disturb phenomenon occurs.

In this event, since a degree of scattering of the EC (EC') in the specific word line (WL') included in the free page area 801 is also unnaturally shifted and widens, when important data such as a file system is newly recorded in the free page area 801, it is not possible to normally record data in other cells (e.g., C1', C2', and C3') due to influence of the EC (e.g., EC') in which the degree of scattering is shifted.

That is, the data newly recorded in the other cells (e.g, C1', C2', and C3') is disturbed by influence of the shifted EC (e.g., EC') and thus an error occurs in a data recording operation. Therefore, in various embodiments of the present invention, before recording new data in the free page area, a degree of scattering of the EC of the word line (WL') in a free page area where the new data will be recorded is detected to previously determine whether it is normal. Then, only when it is normal, the data recording operation is performed so that an error not to occur in a recording operation of important data such as a file system.

Figure 9:
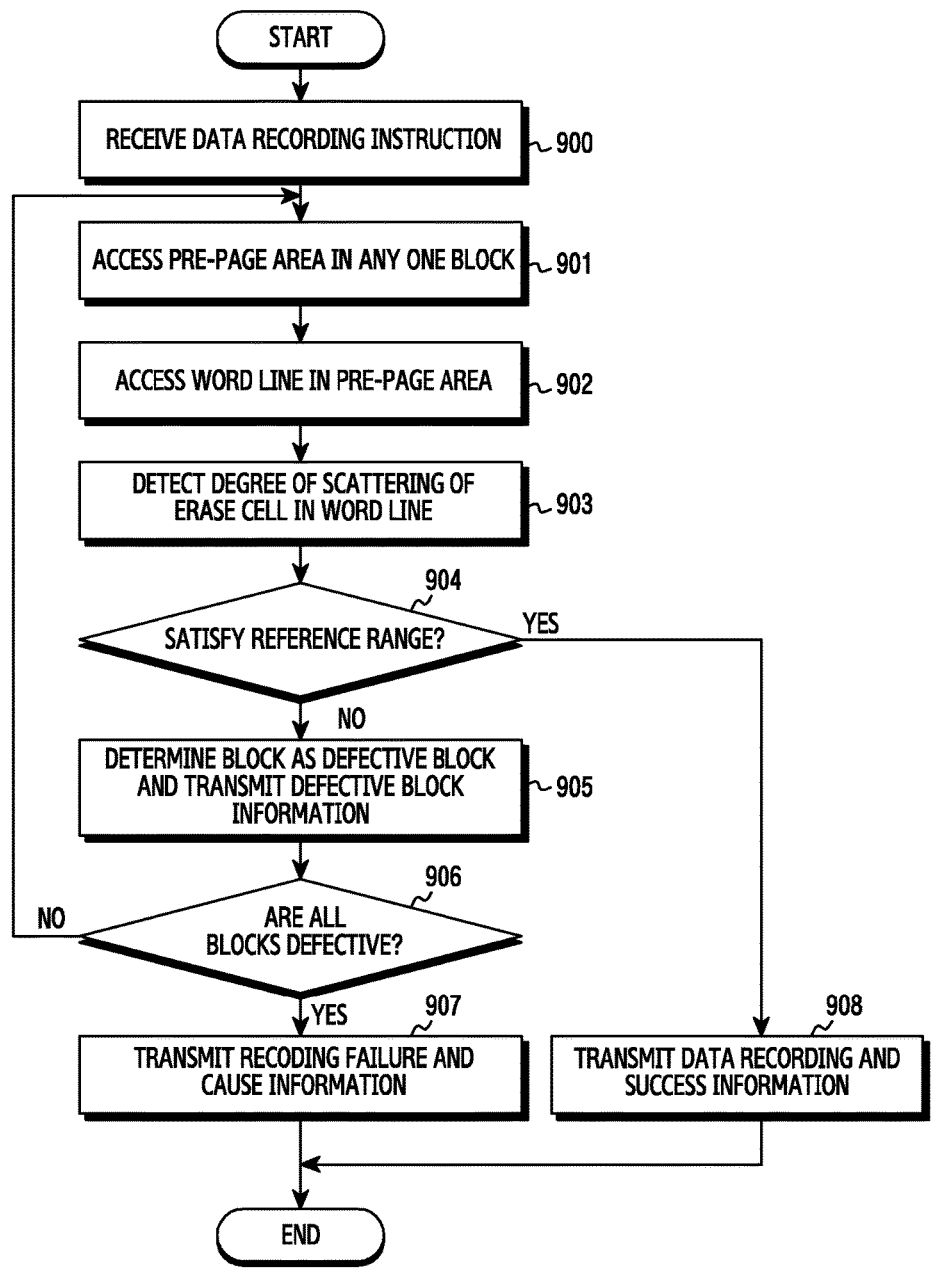
FIG. 9 is a flow chart illustrating a data recording method of the electronic device according to various embodiments of the present invention.

FIG. 9 is a flow chart illustrating the data recording method of the electronic device according to various embodiments of the present invention. For example, the internal memory controller 311 in the internal memory 310 as described with reference to FIG. 3 performs a data recording operation of recording data in the memory cell array 312 according to a data recording instruction received from the processor 300. Further, the internal memory controller 311 may firstly determine whether data can be normally recorded before performing the data recording operation.

Referring to FIG. 9, in operation 900, the internal memory controller 311 may receive, from the processor 310, a data recording instruction for requesting a record of important data such as a file system. In operation 901, the internal memory controller 311 may access, according to the data recording instruction, any one block included in the memory cell array 312 and access a free page area where data is not recorded among the access blocks.

In operation 902, the internal memory controller 311 accesses a word line included in the accessed free page area. In operation 903, the internal memory controller 311 detects a degree of scattering of an EC which is a first cell of the accessed word line. In operation 903, the internal memory controller 311 compares whether the detected degree of scattering of the EC satisfies a pre-configured reference range. The reference range may previously configure a result value of experiments conducted in advance.

Figure 10:
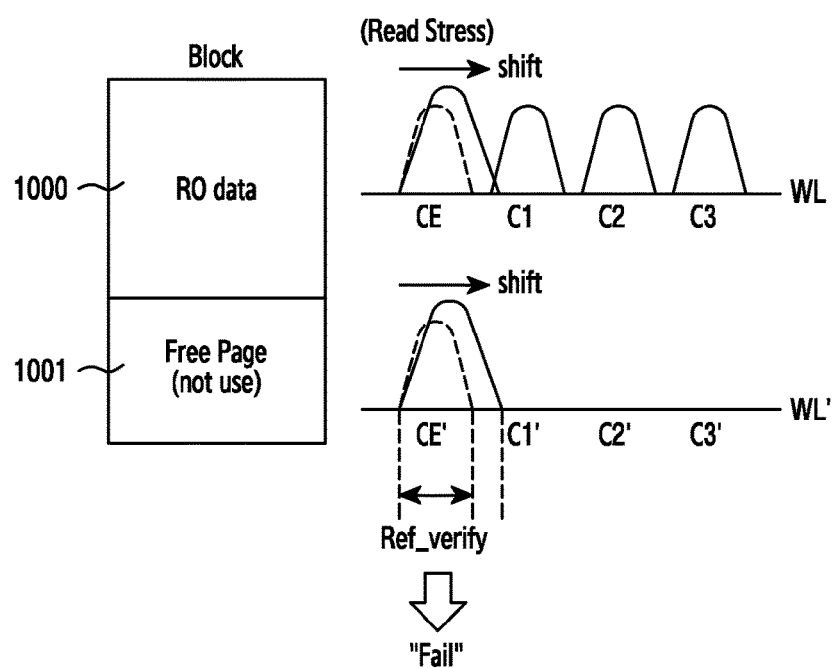
FIGS. 10 and 11 illustrate processes of previously determining a data recording possibility by the electronic device according to various embodiments of the present invention.

In operation 905, for example, as shown in FIG. 10, when the detected degree of scattering of the EC (EC') does not satisfy the reference range, the internal memory controller 311 predicts a recording failure, determines a block including the EC as a defective block, and transmits, to the processor 300, information (e.g., a block number, and a block ID) which can identify the block as defective block information. When the block including the EC is determined as the defective block, the internal memory controller 311 repeats an operation of selecting a word line in any block different from the defective block and detecting the degree of scattering of the EC.

In operation 906, the internal memory controller 311 determines that data recording is impossible when all blocks in the memory cell array 312 are defective. In operation 907, the internal memory controller 311 transmits at least one of recording failure information and recording failure cause information to the processor 300. The recording failure cause information may be, for example, information for notifying of a cause of the recording failure is made by read disturb.

Figure 11:
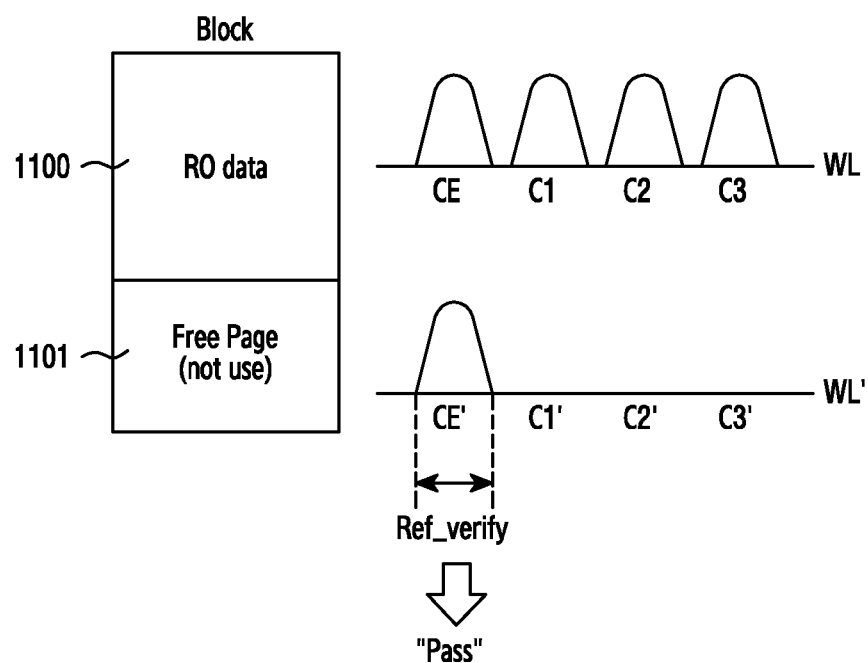

Meanwhile, in operation 908, for example, as shown in FIG. 11, when the detected degree of scattering of the EC satisfies the reference range, the internal memory controller 311 may predict recording pass, record data, and transmit information for notifying of a success of the data recording operation to the processor 300.

An operation (e.g., operation 904, operation 905, and operation 906) of determining a data recording possibility and determining whether data is recorded based on the data recording possibility, among various operations performed by the internal memory controller 311 may be performed by the processor 300 for controlling the internal memory controller 311.

That is, when the internal memory controller 311 does not include an application program or algorithm for determining the data recording possibility and determining whether the data is recorded, the processor 300 may control the internal memory controller 311 to perform the operation of determining the data recording possibility and determining whether the data is recorded instead of the internal memory controller 311 itself.

Figure 12:
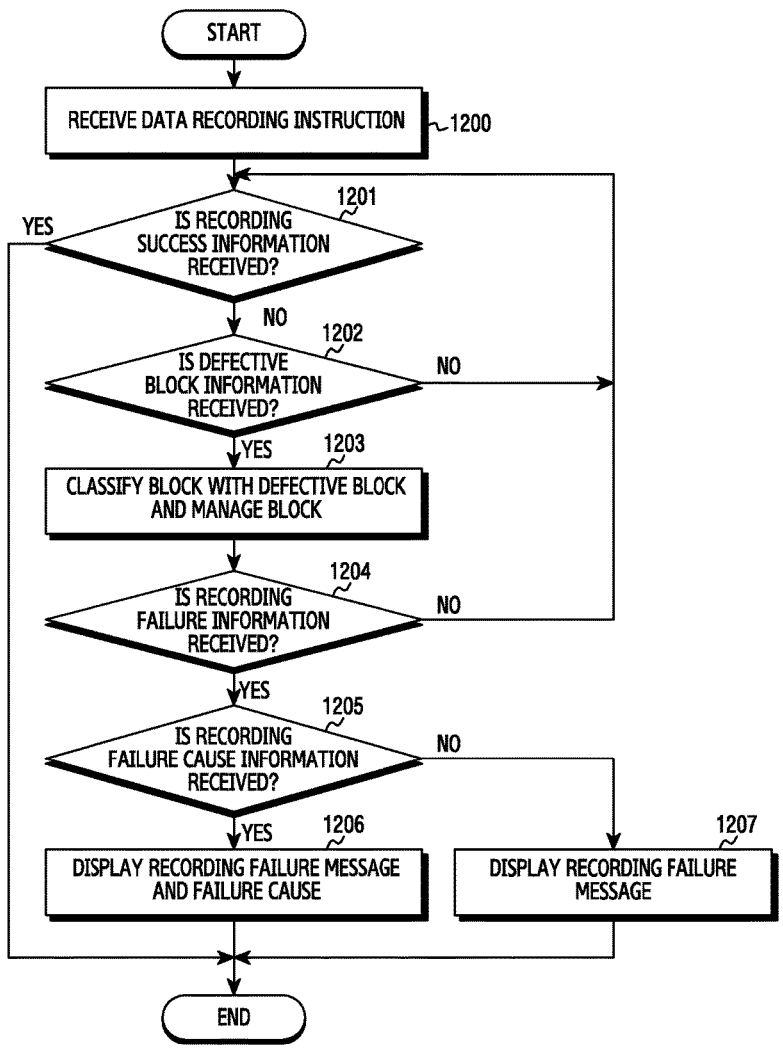
FIG. 12 is a flow chart illustrating the data recording method of the electronic device according to various embodiments of the present invention.

FIG. 12 is a flow chart illustrating the data recording method of the electronic device according to various embodiments of the present invention. For example, the processor 300 as described with reference to FIG. 3 may perform a data recording operation of recording data in the memory cell array 312, and receive information on a data recording success or a data recording failure received from the internal memory controller 311, by controlling the internal memory controller 311.

Referring to FIG. 12, in operation 1200, the processor 300 may transmit, to the internal memory controller 311, a data recording instruction for requesting data recording. The data recording instruction may be transmitted together with important data such as a file system, or be transmitted before or after transmission of the important data. The processor 300 may identify whether recording success information is received from the internal memory controller 311 after transmitting the data recording instruction.

When the recording success information has not been received from the internal memory controller 311 in operation 1201, the processor 300 may identify whether defective block information is received from the internal memory controller 311 in operation 1202. As described with reference to FIG. 9, the defective block information is information capable of identifying a specific block including a word line in which data recording is impossible because a degree of scattering of an erase cell (EC) exceeds a reference range, and the detect block information may be variously referred to as garbage block information, or the like.

In operation 1203, the processor 300 may classify and manage a specific block, which cannot be recorded in the memory cell array 312, as a defective block based on the defective block information received from the internal memory controller 311. For example, as shown in FIG. 13, the processor 300 may add defective block information (e.g., block 5) 3000 in garbage collection information managed by database or a lookup table, and classify and manage the defective block information 3000. The defective block information (e.g., block 5) may be linked with internal memory information (e.g., eMMC1) 3001 corresponding thereto, and be classified and managed in the garbage collection information. The garbage collection information may be referred to as various predetermined names.

Furthermore, the processor 300 may perform a garbage collection operation based on the garbage collection information. The garbage collection operation is a publicly known technology for preventing a defective block, in which the data recording is impossible, from being unnecessarily accessed, and a program executing this function is referred to as a garbage collector.

The processor 300 may determine whether recording failure information is received from the internal memory controller 311 in operation 1204 and may determine whether recording failure cause information is received in operation 1205. The recording failure cause information may be, for example, information for notifying that all blocks in the memory cell array 312 are defective blocks so that the data cannot be recorded anymore.

Figure 14:
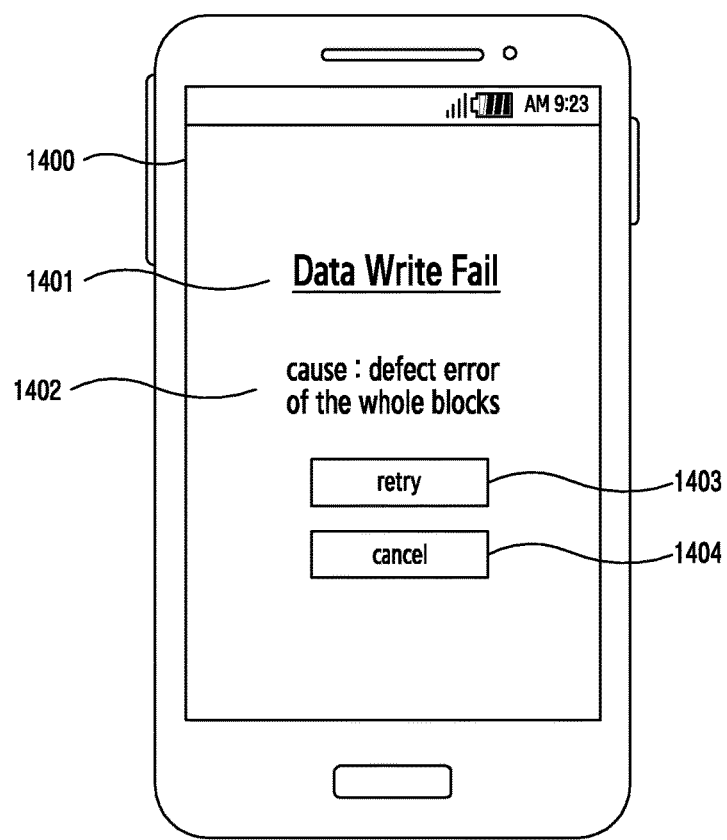
FIG. 14 illustrates a display screen of an electronic device according to various embodiments of the present invention.

In operation 1206, the processor 300 may display, on a display screen, a message for informing of the recording failure and a message for informing of the recording failure cause based on the recording failure information and the recording failure cause information. For example, as shown in FIG. 14, in a display screen 1400 of an electronic device such as a smart phone, at least one of a message (e.g., data write fail) 1401 for informing of the data recording failure and a message (e.g., defective error of the whole blocks) for informing of the recording failure cause may be displayed.

Furthermore, the display screen 1400 of the electronic device may additionally display a menu (e.g., retry) 1403 for requesting a retry of the data recording operation from a user, and a menu (e.g., cancel) 1404 for requesting a cancellation of the data recording operation from the user.

In operation 1207, when only the recording failure information has been received without the record failure cause information, the processor 300 may display the message for informing of the recording failure on the display screen. Furthermore, as described with reference to FIG. 14, the menu (e.g., retry) 1403 for requesting the retry of the data recording operation from the user, and the menu (e.g., cancel) 1404 for requesting the cancellation of the data recording operation from the user may be additionally displayed.

Various embodiments of the present invention may be applied to all types of non-volatile memories such as internal flashes or external flashes. Methods stated in claims and/or specifications according to various embodiments may be implemented by hardware, software, or a combination of hardware and software. In the implementation of software, a computer-readable storage medium for storing one or more programs (software modules) may be provided. The one or more programs stored in the computer-readable storage medium may be configured for execution by one or more processors 120 within the electronic device. The at least one program may include instructions that cause the electronic device to perform the methods according to various embodiments of the present invention as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In various specific embodiments of the present invention as described above, an element or elements included in the present invention are expressed in a singular form or plural form according to the presented specific embodiments. However, the singular form or plural form is selected for convenience of description suitable for the presented situation, and various embodiments of the present invention are not limited to a single element or multiple elements thereof. Further, either multiple elements expressed in the description may be configured into a single element or a single element in the description may be configured into multiple elements.

Meanwhile, while the invention has been shown and described with reference to specific embodiments thereof in the detailed description of the present invention, it goes without saying that various changes in form and details may be made therein without departing from the spirit and scope of the invention. Therefore, the scope of the present invention should not be defined as being limited to the embodiments, but should be defined by the appended claims and equivalents thereof.

The invention claimed is:

1. A method of operating an electronic device, the method comprising:
    determining a data recording possibility of a specific area of a non-volatile memory, where data is not recorded, in which data is to be recorded; and
    determining whether to record data based on the data recording possibility,
    wherein the data recording possibility is determined based on a degree of scattering of an erase cell of a word line included in the specific area where data is not recorded, among predetermined blocks included in a memory cell array of the non-volatile memory.

2. The method of claim 1, wherein the determining of the data recording possibility comprises determining, if the degree of scattering satisfies a pre-configured reference range, that data recording is possible and otherwise, determining that the data recording is impossible.

3. The method of claim 1, further comprising:
    managing identification information of the specific area as garbage collection information if data is not recorded due to the determination.

4. The method of claim 3, wherein the identification information of the specific area corresponds to identification information of a defective block in which data recording is impossible, and the identification information of the defective block is linked with identification information of the non-volatile memory and stored.

5. The method of claim 1, further comprising:
    determining a data recording possibility of another specific area of the non-volatile memory if data is not recorded due to the determination.

6. The method of claim 5, further comprising:
    displaying, on a display of the electronic device, at least one of a message for informing of a recording failure and a message for informing of a recording failure cause in response to determining that data recording of all blocks in the non-volatile memory is impossible.

7. The method of claim 6, wherein the display additionally displays at least one of a menu for requesting a retry of a data recording operation, and a menu for requesting a cancellation of the data recording operation.

8. The method of claim 1, wherein the non-volatile memory includes flash memory,
    wherein the memory cell array includes NAND flash memory.

9. An electronic device comprising:
    a non-volatile memory configured to store data; and
    a processor configured to determine a data recording possibility of a specific area of the non-volatile memory, where data is not recorded, and determine whether to record data based on the data recording possibility,
    wherein the processor is configured to determine the data recording possibility based on a degree of scattering of an erase cell of a word line included in the specific area where data is not recorded, among predetermined blocks included in a memory cell array of the non-volatile memory.

10. The electronic device of claim 9, wherein the processor is configured to determine, if the degree of scattering satisfies a pre-configured reference range, that data recording is possible and otherwise, determine that the data recording is impossible.

11. The electronic device of claim 10, wherein the processor is configured to manage identification information of the specific area as garbage collection information if data is not recorded due to the determination.

12. An electronic device comprising:
a non-volatile memory configured to store data; and
a processor configured to control the non-volatile memory,
wherein the non-volatile memory includes an internal memory controller and a memory cell array, and the internal memory controller is configured to determine a data recording possibility of a specific area of the memory cell array, where data is not recorded, and determine whether to record data based on the data recording possibility,
wherein the internal memory controller is configured to determine the data recording possibility based on a degree of scattering of an erase cell of a word line included in the specific area where data is not recorded, among blocks included in the memory cell array.

13. The electronic device of claim 12, wherein the internal memory controller is configured to determine, if the degree of scattering satisfies a pre-configured reference range, that data recording is possible and otherwise, determine that the data recording is impossible.

14. The electronic device of claim 12, wherein the internal memory controller is configured to transmit identification information of the specific area to the processor if data is not recorded due to the determination, and
wherein the processor is configured to manage the identification information of the specific area as garbage collection information.

15. The electronic device of claim 14, wherein the identification information of the specific area corresponds to identification information of a defective block in which data recording is impossible, and the identification information of the defective block is linked with identification information of the non-volatile memory and stored.

* * * * *